Patented Dec. 31, 1935

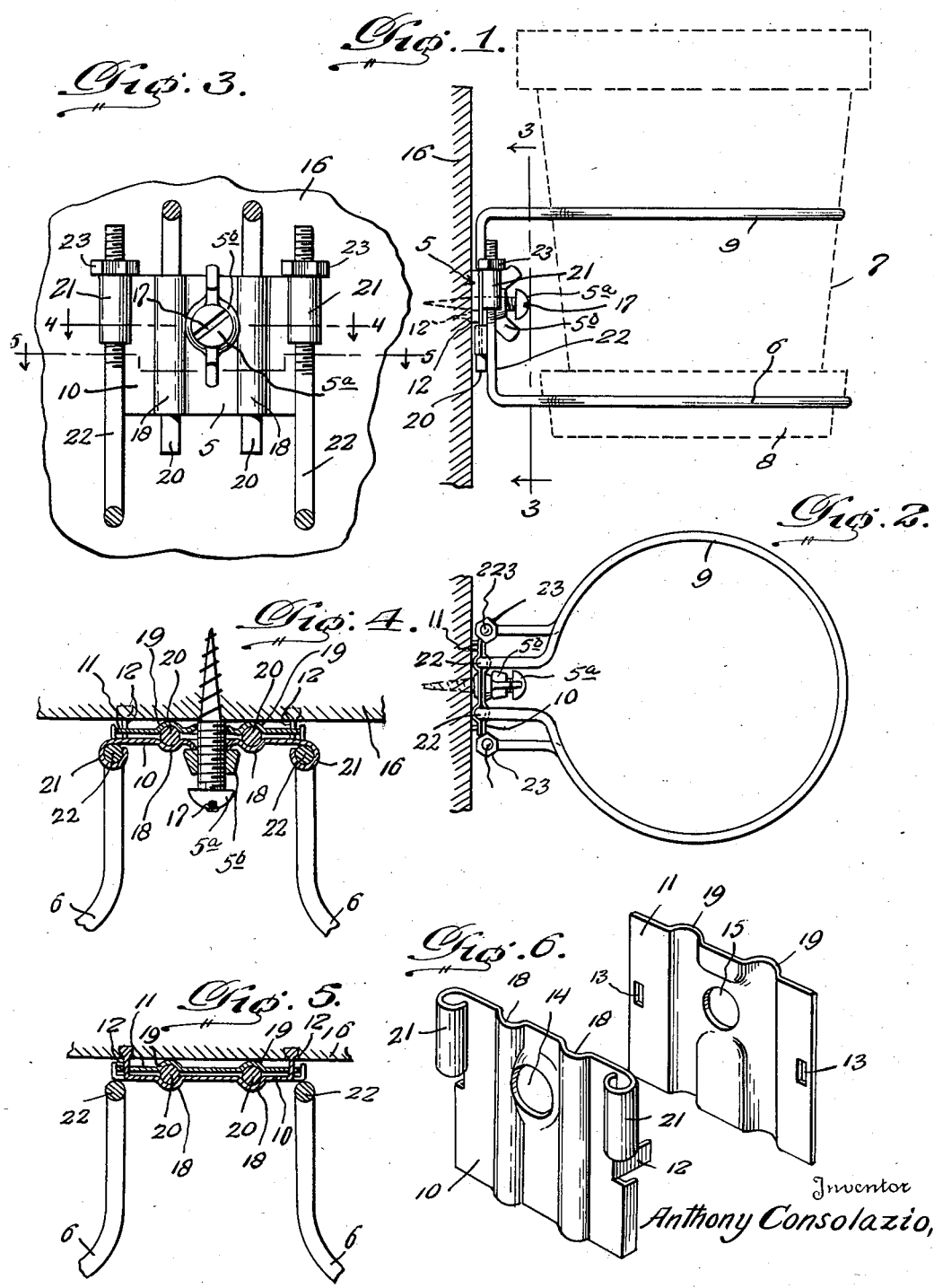

2,025,707

UNITED STATES PATENT OFFICE 2,025,707

FLOWERPOT HOLDER

Anthony Consolazio, Watertown, Mass.

Application April 2, 1934, Serial No. 718,722

6 Claims. (Cl. 248—315)

This invention relates to improvements in flower pot holders of the type disclosed in my U. S. Letters Patent No. 1,930,673 granted October 17, 1933.

The primary object of the present improvement is to provide a flower pot holder of the above kind having simplified and improved means for sustaining the drip saucer and flower pot supporting rings, and for efficiently mounting the same upon a suitable support.

A more specific object of the present invention is to provide a flower pot holder of the above kind including sustaining means for the flower pot and drip saucer supporting rings which is simple and durable in construction, efficient in use, and economical to manufacture.

Other and more specific objects of the present invention will become apparent from the following description when considered in connection with the accompanying drawing, and the invention consists in the novel form, combination and arrangement of parts hereinafter more fully described, illustrated in the drawing and claimed.

In the drawing:

Figure 1 is a side elevational view of a flower pot holder embodying the present invention.

Figure 2 is a top plan view thereof.

Figure 3 is a vertical section on line 3—3 of Figure 1.

Figure 4 is a horizontal section on line 4—4 of Figure 3.

Figure 5 is a horizontal section on line 5—5 of Figure 3; and

Figure 6 is an enlarged developed perspective view showing the members of the sustaining clamp for the flower pot and saucer supporting rings.

Referring more in detail to the drawing, the present flower pot holder comprises generally a mounting device or sustaining clamp 5 embodying a combined mounting and clamping screw 5a provided with a clamping nut 5b, a lower supporting ring 6 for the drip saucer 8, and an upper retaining ring 9 for the flower pot 7, said flower pot being positioned in the ring 9 when the device is in use with the flower pot seated within the drip saucer 8 and the latter seated within the lower supporting ring 6.

The sustaining clamp 5 comprises vertical front and rear sheet metal clamping plates 10 and 11 loosely connected for limited movement toward and from each other by means of rearwardly directed lugs 12 on the sides of the front clamping plate 10 slidably extending through slots 13 in the sides of the rear clamping plate 11 and having horizontally flattened sharp rear ends as shown in Figures 4 and 5 whereby the clamping plates are connected against accidental separation. The clamping plates 10 and 11 have substantially central registered openings 14 and 15 through which the combined clamping and mounting screw 5a is passed for engagement with the support 16, the screw 5a having its outer portion provided with machine threads for adjustable reception of the clamping nut 5b and having its inner portion provided with a wood screw thread so that it may be readily driven into the support 16, the outer end of the screw being provided with a screw driver kerf as at 17 to facilitate driving of the same into the support 16. It will be noted that the arrangement is such that when the clamping nut 5b is threaded onto the screw 5a the rear clamping plate 11 will be forced rearwardly into tight engagement with the support 16 while the front clamping plate 10 will be forced toward the rear clamping plate 11 so as to drive the sharp rear ends of lugs 12 into support 16, thereby firmly securing the clamp against accidental turning movement about the screw 5a from its proper position.

The clamping plates 10 and 11 are provided with spaced pairs of mating vertical grooves or corrugations 18 and 19 at opposite sides of the openings 14 and 15 for reception of the downturned ends 20 of the flower pot retaining ring 9, so that when said downturned ends 20 are received between the clamping plates within the mating grooves 18 and 19, the supporting ring 9 will be firmly sustained in its proper horizontal position upon tightening of clamping screw 5b until the rear clamping plate 11 is brought tightly against the support 16 and the front clamping plate 10 is drawn tightly against the ends 20 and toward the clamping plate 11 with the ends 20 of the ring 9 firmly clamped between said clamping plates in the grooves 18 and 19 of the latter. The ring 9 is of split stiff wire construction, and in this way said ring 9 is detachably connected with the clamp 5 so that quick assembly or separation of the parts is permitted.

Lateral extensions are provided on opposite sides of the front clamping plate 10 that are rolled forwardly and inwardly into tubular form to provide vertical supporting barrels 21 on the sides of said clamping plate 10. These barrels are adapted for slidable reception of the upturned ends 22 of the lower drip saucer supporting ring 6 which is also of split form and formed of relatively stiff wire. Nuts 23 are adjustably threaded upon the upper end portions of the upturned ends 22 of ring 6 above the barrels 21 for securely and adjustably connecting the ring 6 to the clamp 5, as will be apparent. By adjusting nuts 23, the supporting ring 6 may be vertically adjusted relative to clamp 5 within certain limits for a purpose which will presently become apparent. Also, in this way, the supporting ring 6 is effectively detachably connected with the clamp 5.

Obviously, by loosening nut 5b, the upper flower pot supporting ring 9 may be vertically adjusted by sliding the downturned ends 29 thereof vertically relative to the clamp 5. In this way the ring 9 may be adjusted upwardly into engagement with the flower pot, or the latter may be allowed to lower until it rests within the saucer 8 after the latter has been vertically adjusted as far as possible by turning of nuts 23. In some cases, vertical adjustment of ring 6 by turning of nuts 23 will cause the drip saucer to be positioned against the bottom of the flower pot after the latter has been placed in the ring 9 so as to be sustained by the latter.

A mounting device constructed as described above will be efficient and exceedingly durable, as well as convenient to use and economical to manufacture. Minor changes are contemplated within the scope of the invention as claimed.

What I claim as new is:

1. A flower pot holder of the character described comprising a clamp including vertical front and rear clamping plates and a horizontal combined mounting and clamping screw passing through said clamping plates for forcing the latter together and securing the same to a support, a flower pot supporting ring having downturned ends secured between said clamping plates, and a lower drip saucer supporting ring carried by said front clamping plate.

2. A flower pot holder of the character described comprising a clamp including vertical front and rear clamping plates and a horizontal combined mounting and clamping screw passing through said clamping plates for forcing the latter together and securing the same to a support, a flower pot supporting ring having downturned ends secured between said clamping plates, a lower drip saucer supporting ring carried by said front clamping plate, and means to vertically adjust said drip saucer supporting ring relative to said front clamping plate.

3. A flower pot holder of the character described comprising a clamp including vertical front and rear clamping plates and a horizontal combined mounting and clamping screw passing through said clamping plates for forcing the latter together and securing the same to a support, a flower pot supporting ring having downturned ends secured between said clamping plates, and a lower drip saucer supporting ring carried by said front clamping plate, the downturned ends of said flower pot supporting ring being of a length to permit vertical adjustment of said latter ring relative to the clamp, said clamp being adapted to retain said flower pot supporting ring in any vertically adjusted position.

4. A flower pot holder of the character described comprising a sustaining clamp composed of vertical front and rear clamping plates provided with registered substantially central openings and a mounting and clamping screw for said clamping plates having an inner portion threaded for being driven into a support and an outer threaded portion, said clamp further including a clamping nut adjustable on said outer threaded portion of the mounting and clamping screw to tightly draw the rear clamping plate against the support and the front clamping plate toward the rear clamping plate, a split flower pot supporting ring having downturned ends secured between said clamping plates, and a lower drip saucer supporting ring carried by the front clamping plate.

5. A flower pot holder of the character described comprising a sustaining clamp composed of vertical front and rear clamping plates provided with registered substantially central openings and a mounting and clamping screw for said clamping plates having an inner portion threaded for being driven into a support and an outer threaded portion, said clamp further including a clamping nut adjustable on said outer threaded portion of the mounting and clamping screw to tightly draw the rear clamping plate against the support and the front clamping plate toward the rear clamping plate, a split flower pot supporting ring having downturned ends secured between said clamping plates, a lower drip saucer supporting ring carried by the front clamping plate, said front clamping plate having tubular side barrels, said lower supporting ring having upturned ends slidably extending through said barrels, and nuts adjustably threaded on the upper portions of the upturned ends of the drip saucer supporting ring above said barrels for vertically adjusting said drip saucer supporting ring relative to the clamp.

6. A flower pot holder of the character described comprising a clamp including vertical front and rear clamping plates and a horizontal combined mounting and clamping screw passing through said clamping plates for forcing the latter together and securing the same to a support, a flower pot supporting ring having downturned ends secured between said clamping plates, a lower drip saucer supporting ring carried by said front clamping plate, and means loosely connecting said clamping plates for limited movement toward and from each other including rearwardly directed lugs on the sides of the front clamping plate slidably extending through the rear clamping plate and having horizontally flat sharp rear ends arranged to penetrate the support and prevent rotation of the clamping plates about the mounting and clamping screw.

ANTHONY CONSOLAZIO.